United States Patent
Tashiro et al.

(10) Patent No.: US 9,774,810 B2
(45) Date of Patent: Sep. 26, 2017

(54) SOLID-STATE IMAGE SENSOR AND CAMERA

(71) Applicant: CANON KABUSHIKI KAISHA, Tokyo (JP)

(72) Inventors: Kazuaki Tashiro, Isehara (JP); Takashi Moriyama, Yokohama (JP); Tatsuhito Goden, Machida (JP); Toshiaki Ono, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 15/064,805

(22) Filed: Mar. 9, 2016

(65) Prior Publication Data

US 2016/0295147 A1 Oct. 6, 2016

(30) Foreign Application Priority Data

Mar. 30, 2015 (JP) ................................ 2015-069807

(51) Int. Cl.
*H04N 5/378* (2011.01)
*H04N 5/369* (2011.01)

(52) U.S. Cl.
CPC .......... *H04N 5/378* (2013.01); *H04N 5/3698* (2013.01)

(58) Field of Classification Search
CPC ...... H04N 5/378; H04N 5/3698; H04N 5/367; H04N 5/365
USPC ................................................. 348/300, 294
See application file for complete search history.

(56) References Cited

U.S. PATENT DOCUMENTS

| | | | |
|---|---|---|---|
| 5,159,422 A | 10/1992 | Tashiro et al. | |
| 5,366,921 A | 11/1994 | Tashiro | |
| 6,069,393 A | 5/2000 | Hatanaka et al. | |
| 6,633,173 B1 * | 10/2003 | Orban | G01R 31/311 |
| | | | 324/754.23 |
| 6,717,151 B2 | 4/2004 | Tashiro et al. | |
| 6,800,836 B2 | 10/2004 | Hamamoto et al. | |
| 7,129,458 B2 | 10/2006 | Hamamoto et al. | |
| 7,787,037 B2 | 8/2010 | Ono et al. | |
| 7,817,199 B2 | 10/2010 | Yamashita et al. | |
| 7,986,353 B2 | 7/2011 | Ono | |
| 8,085,319 B2 | 12/2011 | Ono et al. | |
| 8,670,049 B2 | 3/2014 | Ono et al. | |
| 8,675,107 B2 | 3/2014 | Yamashita et al. | |

(Continued)

FOREIGN PATENT DOCUMENTS

| | | | | |
|---|---|---|---|---|
| EP | 1343024 A1 * | 9/2003 | | A61B 6/032 |
| JP | H09-116022 A | 5/1997 | | |
| WO | 02/42797 A1 | 5/2002 | | |

*Primary Examiner* — Nhan T Tran
(74) *Attorney, Agent, or Firm* — Fitzpatrick, Cella, Harper & Scinto

(57) ABSTRACT

An image sensor includes a readout unit having a plurality of circuit blocks. At least a part of each of the plurality of circuit blocks is arranged in each of a plurality of regions electrically isolated from each other. When latchup has occurred in a circuit block of the plurality of circuit blocks, the voltage supply unit shuts off supply of a power supply voltage to the region in which the part is arranged, and then performs the supply of the power supply voltage to the region in which the part is arranged, and the voltage supply unit supplies the power supply voltage to the region in which the circuit block without latchup is arranged, while shutting off the supply of the power supply voltage to the region in which the part is arranged.

22 Claims, 12 Drawing Sheets

(56) References Cited

U.S. PATENT DOCUMENTS

| | | |
|---|---|---|
| 8,810,705 B2 | 8/2014 | Ono |
| 8,860,858 B2 | 10/2014 | Ono |
| 9,025,041 B2 | 5/2015 | Ono |
| 9,025,059 B2 | 5/2015 | Tashiro |
| 9,093,340 B2 | 7/2015 | Ono |
| 9,137,471 B2 | 9/2015 | Ono et al. |
| 9,153,610 B2 | 10/2015 | Kobayashi et al. |
| 9,261,769 B2 | 2/2016 | Tashiro et al. |
| 2003/0107406 A1* | 6/2003 | Li .................... H03K 19/00315 326/83 |
| 2005/0045925 A1* | 3/2005 | Yoshida ............ H01L 27/14601 257/291 |
| 2014/0333814 A1 | 11/2014 | Tashiro |
| 2015/0009385 A1 | 1/2015 | Tsukida et al. |
| 2015/0077605 A1 | 3/2015 | Takada et al. |
| 2015/0130978 A1 | 5/2015 | Tashiro et al. |
| 2015/0138415 A1 | 5/2015 | Ono |
| 2015/0215562 A1 | 7/2015 | Tashiro |
| 2015/0341579 A1 | 11/2015 | Kobayashi et al. |
| 2016/0014352 A1* | 1/2016 | Moriyama ............. H04N 5/335 348/294 |
| 2016/0027825 A1* | 1/2016 | Moriyama ............. H04N 5/374 348/164 |
| 2016/0035769 A1 | 2/2016 | Goden et al. |

* cited by examiner

SOLID-STATE IMAGE SENSOR AND CAMERA

BACKGROUND OF THE INVENTION

Field of the Invention

The present invention relates to a solid-state image sensor and a camera equipped with it.

Description of the Related Art

When a high-energy particle enters a solid-state image sensor, a single event latchup (SEL) may occur. The high-energy particle can include, for example, cosmic rays in space and radiation in an atomic power plant or a radiation image diagnosis. The SEL may occur in, for example, a thyristor structure to which pn junctions are connected in series in a CMOS circuit. When the SEL occurs, a voltage line and a ground line are conducted to each other. Thus, an apparatus which takes no measures against this is set in an inoperative state owing to occurrence of the SEL. It is therefore necessary, when the SEL occurs, to restart the supply of a power supply voltage to the apparatus after it is shut off temporarily.

Japanese Patent Laid-Open No. 9-116022 describes a CMOS integrated circuit. The CMOS integrated circuit includes a latchup detection means for detecting occurrence of a latchup and a means for stopping the supply of a power supply voltage to the CMOS integrated circuit in accordance with a signal output from the latchup detection means.

International Publication No. 2002/042797 describes a radiation image diagnosis apparatus. The radiation image diagnosis apparatus includes a plurality of element blocks for detecting radiation, and a plurality of ASICs which correspond to the plurality of element blocks and include processing circuits and readout circuits. When each ASIC receives an abnormal output from the corresponding one of element blocks for some reason, it causes a latchup. The radiation image diagnosis apparatus monitors power supply to each of the plurality of element blocks and stops power supply to the ASIC, out of the plurality of ASICs, which processes a signal from the element block where an abnormality has been detected.

In the radiation image diagnosis apparatus described in International Publication No. 2002/042797, there are a number of pixels which cannot obtain signals due to occurrence of the latchup because the power supply is controlled by using each ASIC, that is, an IC (semiconductor chip) as a unit. Hence, in the radiation image diagnosis apparatus, there are a number of pixels which lose the signals at occurrence of the latchup. Note that International Publication No. 2002/042797 does not suggest that power supply to a partial region in each IC can be controlled.

SUMMARY OF THE INVENTION

An aspect of the present invention provides a technique of, when latchup has occurred in at least one circuit block of a plurality of circuit blocks which constitute a readout unit of a solid-state image sensor formed on a semiconductor substrate, continuing a readout operation by other circuit blocks while recovering the at least one circuit block from the latchup.

One of the aspects of the present invention provides a solid-state image sensor comprising: a pixel array including a plurality of pixels; a readout unit configured to read out a signal from the pixel array; and a voltage supply unit, wherein the pixel array, the readout unit, and the voltage supply unit are arranged in a semiconductor substrate, the readout unit includes a plurality of circuit blocks and the plurality of circuit blocks are respectively arranged in a plurality of regions electrically isolated from each other in the semiconductor substrate, at least a part of each of the plurality of circuit blocks being arranged in a corresponding one of the plurality of regions, when latchup has occurred in at least one circuit block out of the plurality of circuit blocks, the voltage supply unit shuts off supply of a power supply voltage to the region, out of the plurality of regions, in which at least the part of the at least one circuit block is arranged, and thereafter performs the supply of the power supply voltage to the region in which at least the part of the at least one circuit block is arranged, and the voltage supply unit supplies the power supply voltage to the region, out of the plurality of regions, in which at least the part of the circuit block where no latchup is being occurred is arranged, while shutting off the supply of the power supply voltage to the region in which at least the part of the at least one circuit block is arranged.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings.

Figure 1:
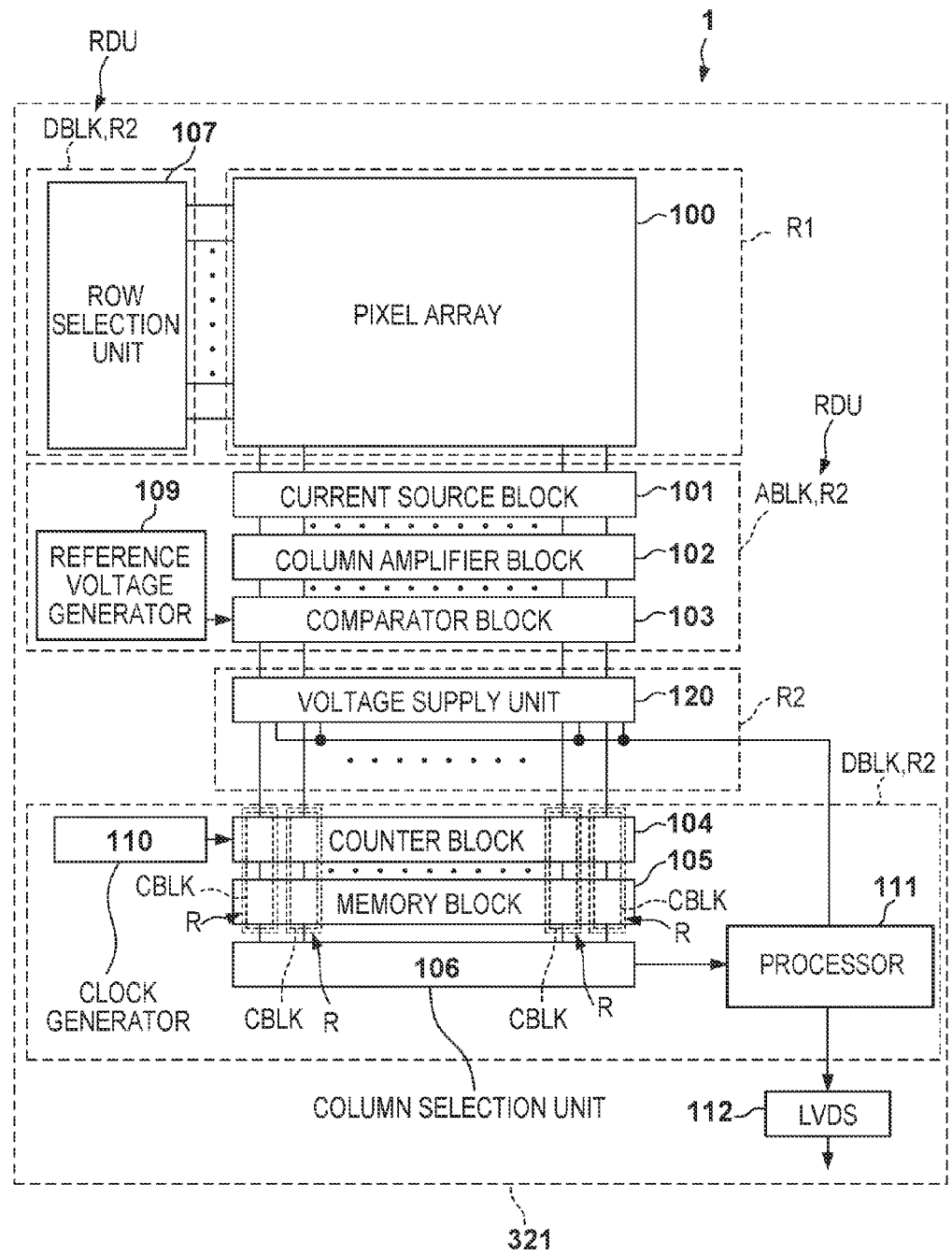
FIG. 1 is a block diagram showing the arrangement of a solid-state image sensor according to one embodiment of the present invention.

FIG. 1 shows the arrangement of a solid-state image sensor 1 according to one embodiment of the present invention. The solid-state image sensor 1 can be configured as a CMOS image sensor. The solid-state image sensor 1 includes a semiconductor substrate 321 including a first region R1 and second regions R2 different from each other. The solid-state image sensor 1 can include a pixel array 100 including a plurality of pixels arrayed so as to form a plurality of rows and a plurality of columns, readout units (or readout circuits) RDU which read out signals from the pixel array 100, and a voltage supply unit (or voltage supply circuit) 120 which supplies a power supply voltage to each readout unit RDU. The pixel array 100 is arranged in the region R1. The readout units RDU are arranged in the regions R2.

The readout units RDU include an analog circuit block ABLK arranged in the region ABLK and a digital circuit block DBLK arranged in the region DBLK. The readout units RDU include a plurality of circuit blocks CBLK. At least parts of the plurality of circuit blocks CBLK are respectively arranged in a plurality of regions R electrically isolated from each other in the semiconductor substrate 321. In other words, at least a part of each circuit block CBLK is arranged in one corresponding region R out of the plurality of regions R electrically isolated from each other in the semiconductor substrate 321. From another viewpoint, the plurality of circuit blocks CBLK are separately arranged in the plurality of regions R electrically isolated from each other in the semiconductor substrate 321.

For example, one circuit block CBLK out of the plurality of circuit blocks CBLK is arranged in one region R out of the plurality of regions R. Another circuit block CBLK out of the plurality of circuit blocks CBLK is arranged in another region R out of the plurality of regions R. One region R and the other region R are electrically isolated from each other. The region R in which at least a part of one circuit block CBLK is arranged and the region R in which at least a part of any other circuit block CBLK is arranged may electrically be isolated from each other.

When latchups have occurred in some circuit blocks CBLK out of the plurality of circuit blocks CBLK, the voltage supply unit 120 temporarily shuts off the supply of the power supply voltage to the regions R in which at least the parts of the some circuit blocks CBLK are arranged. Then, the voltage supply unit 120 performs again, that is, restarts the supply of the power supply voltage to the regions R where the supply of the power supply voltage is temporarily shut off. The voltage supply unit 120 continues to supply the power supply voltage to the regions R in which at least parts of the circuit blocks CBLK, out of the plurality of circuit blocks CBLK, where no latchup has occurred are arranged. That is, the voltage supply unit 120 supplies the power supply voltage to the regions R in which the other circuit blocks CBLK where no latchup has occurred are arranged while shutting off the supply of the power supply voltage to the regions R in which the circuit blocks CBLK where the latchup has occurred are arranged. Upon receiving a power supply voltage supplied outside of the solid-state image sensor 1, the voltage supply unit 120 supplies that power supply voltage, or a power supply voltage obtained by dropping or raising that power supply voltage to the plurality of regions R in which the plurality of circuit blocks CBLK are arranged. A voltage supply unit (not shown) supplies a power supply voltage to the pixel array 100. As exemplary shown in FIG. 2, the solid-state image sensor 1 can include a detection block 121 which includes a plurality of detectors each detecting occurrence of the latchup in each of the plurality of regions R in which the plurality of circuit blocks CBLK are arranged. Note that the detection block 121 can be arranged outside the solid-state image sensor 1. The detection block 121 arranged outside can detect occurrence of the latchup by detecting an abnormality in an image output from the solid-state image sensor 1 such as a vertical line defect to be described later.

The readout units RDU can include, for example, a row selection unit 107, a current source block 101, a column amplifier block 102, a comparator block 103, a reference voltage generator 109, a counter block 104, a clock generator 110, a memory block 105, and a column selection unit 106. The readout units RDU can further include a processor 111 and/or an LVDS (Low Voltage Differential Signaling) circuit 112.

The row selection unit 107 selects the rows in the pixel array 100. The current source block 101 can include a plurality of current sources corresponding to the plurality of columns in the pixel array 100. Each pixel in the pixel array 100 can include a photoelectric converter and an amplification transistor which outputs, to a column signal line, a signal corresponding to charges generated in the photoelectric converter. Each current source of the current source block 101 is connected to the column signal line of the corresponding column. The amplification transistor of each pixel and each current source of the current source block 101 can constitute a source follower circuit. The column amplifier block 102 can include a plurality of column amplifiers corresponding to the plurality of columns in the pixel array 100. Each column amplifier amplifies the signal output to the column signal line.

The comparator block 103 can include a plurality of comparators corresponding to the plurality of columns in the pixel array 100. The counter block 104 can include a plurality of counters corresponding to the plurality of columns in the pixel array 100. The counter block 104 includes a single counter. The single counter can be shared by the plurality of columns. Considering that a latchup may occur in a region in which the counter is arranged, however, it is preferable that the plurality of counters corresponding to the plurality of columns in the pixel array 100 are provided. The memory block 105 can include a plurality of memories provided for each column in the pixel array 100. Each memory can be formed by, for example, a flip-flop circuit or a latch circuit.

Each comparator of the comparator block 103, each counter of the counter block 104, and each memory of the memory block 105 constitute an AD converter (column AD converter) which converts an analog signal output from each column amplifier into a digital signal. Each comparator compares the magnitude relationship between a reference signal such as a ramp signal generated by the reference voltage generator 109 and the analog signal output from each column amplifier, and outputs a latch signal in response to the reversal of the magnitude relationship. Each counter performs a count operation in response to a clock generated by the clock generator (for example, a PLL (Phase-Locked Loop) circuit) 110. Each memory receives a count value as the output from the counter of the corresponding column when the latch signal is output from the comparator of the corresponding column. This count value is the digital signal corresponding to the analog signal output from the column amplifier.

The current sources of the current source block 101, the column amplifiers of the column amplifier block 102, the comparators of the comparator block 103, and the reference voltage generator 109 can be formed by NMOS circuits or PMOS circuits. The current source block 101, the column amplifier block 102, the comparator block 103, and the reference voltage generator 109 can constitute the analog circuit block ABLK.

The counters of the counter block 104 and the memories of the memory block 105 can be formed by CMOS circuits. The counters of the counter block 104 and the memories of the memory block 105 need to be arranged in accordance with the arrangement pitch of the pixels 1. Thus, transistors can be arranged in the counter block 104 and the memory block 105 with a high integration degree. Therefore, the counters of the counter block 104 and the memories of the memory block 105 are circuits which are likely to cause a latchup upon the entry of a high energy beam. So, at least one counter of the counter block 104 and at least one memory of the memory block 105 constitute one circuit block CBLK arranged in the regions R electrically isolated from each other. When the latchups have occurred in some circuit blocks CBLK out of the plurality of circuit blocks CBLK, the voltage supply unit 120 temporarily shuts off the supply of the power supply voltage to the regions R, out of the plurality of regions R, in which at least the parts of the some circuit blocks CBLK are arranged. Then, the voltage supply unit 120 restarts the supply of the power supply voltage to the regions R in which at least the parts of the some circuit blocks CBLK are arranged. Further, the voltage supply unit 120 continues to supply the power supply voltage to the regions R in which the circuit blocks CBLK, out of the plurality of circuit blocks CBLK, where no latchup have occurred are arranged.

The column selection unit 106 selects the digital signal on one row converted by the AD converter in a predetermined order and outputs it to the processor 111. The processor 111 processes and outputs the digital signal supplied from the column selection unit 106. The LVDS circuit 112 converts the amplitude of the digital signal output from the processor 111 and outputs the signal. The column selection unit 106, the clock generator 110, and the processor 111 are formed with a structure in which sufficient latchup measures are taken since they have few layout constraints. The row selection unit 107, the counter block 104, the clock generator 110, the memory block 105, the column selection unit 106, and the processor 111 can constitute the digital circuit blocks DBLK.

Figure 2:
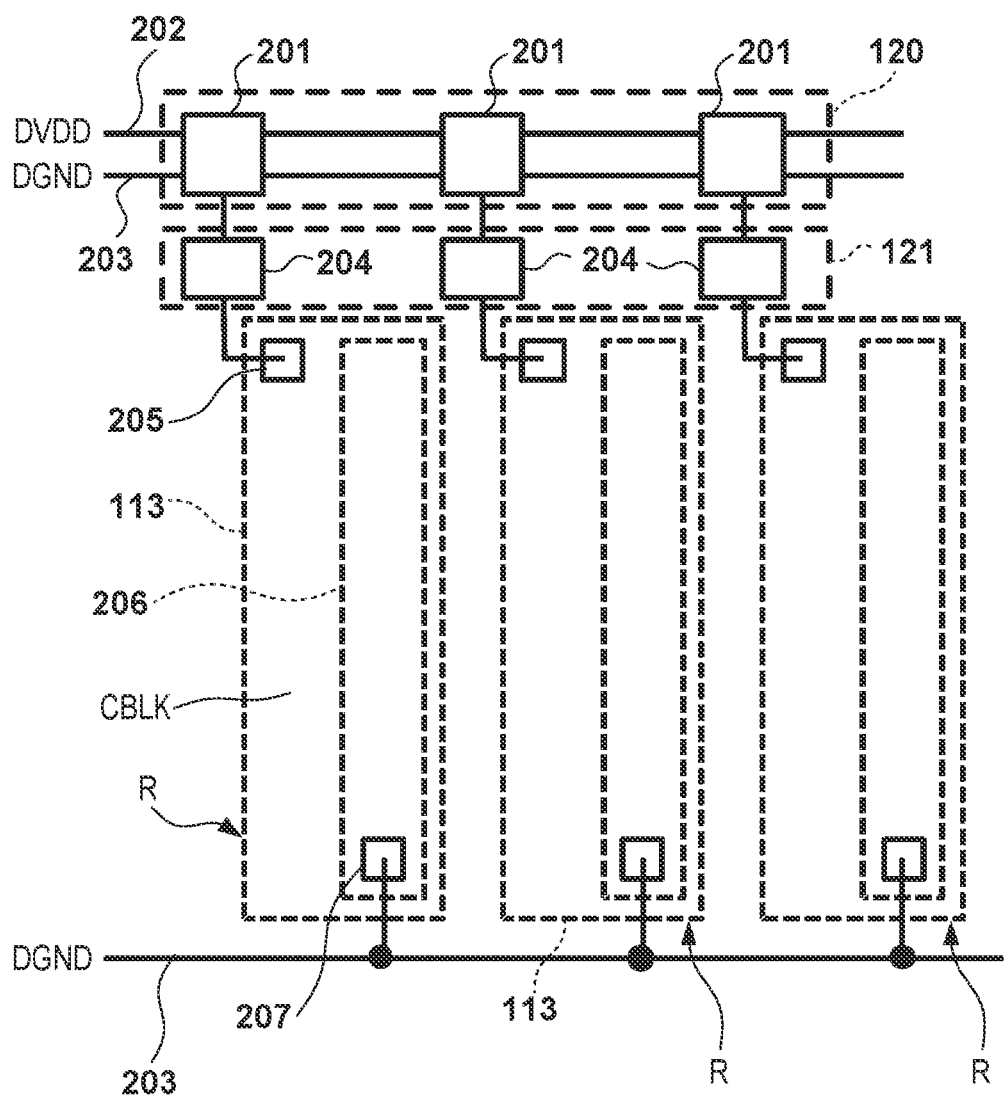
FIG. 2 is a schematic plan view showing the solid-state image sensor according to the first embodiment of the present invention.

FIG. 2 is a schematic plan view showing the solid-state image sensor 1 according to the first embodiment of the present invention. FIG. 2 shows the circuit blocks CBLK (the counters and the memories which constitute the AD converters) on three columns together with the voltage supply unit 120 and the detection block 121. The respective circuit blocks CBLK can be arranged in n-type wells 113 which constitute the regions R electrically isolated from each other. Each n-type well 113 is also electrically isolated from a well which constitutes another circuit. A well in which the analog circuit block ABLK is arranged and wells in which the digital circuit blocks DBLK are arranged may electrically be isolated from each other, and the n-type wells 113 may electrically be isolated from each other in the wells in which the digital circuit blocks DBLK are arranged.

P-type wells 206 are arranged in the n-type wells 113. A PMOS transistor arranged in each n-type well 113 and an NMOS transistor arranged in each p-type well 206 constitute a CMOS circuit. A power supply voltage DVDD for a digital circuit is supplied to the circuit blocks CBLK via a voltage line 202. A ground voltage DGND for the digital circuit is supplied to the circuit blocks CBLK via a ground line 203.

The voltage supply unit 120 includes a plurality of voltage supply circuits 201 provided so as to correspond to the plurality of circuit blocks CBLK. The detection block 121 includes a plurality of detectors 204 provided so as to correspond to the plurality of circuit blocks CBLK. Each detector 204 detects occurrence of the latchup in the region R (n-type well 113) in which at least the part of the corresponding circuit block CBLK is arranged. When the corresponding detector 204 detects occurrence of the latchup in the region R in which at least the part of the corresponding circuit block CBLK is arranged, the voltage supply circuit 201 temporarily shuts off the supply of the power supply voltage to the circuit block CBLK. Then, the voltage supply circuit 201 shuts off the supply of the power supply voltage to the region R where the supply of the power supply voltage has been shut off. This recovers the region R where the latchup has occurred from a latchup state. Unless the corresponding detector 204 detects occurrence of the latchup in the region R in which the corresponding circuit block CBLK is arranged, the voltage supply circuit 201 continues to supply the power supply voltage to the region R in which at least the part of the circuit block CBLK is arranged.

Well contacts 205 are provided in the n-type wells 113. The power supply voltage DVDD can be supplied to the n-type wells 113 via the well contacts 205. The ground voltage DGND can be supplied to the p-type wells 206 via well contacts 207.

Figure 3:
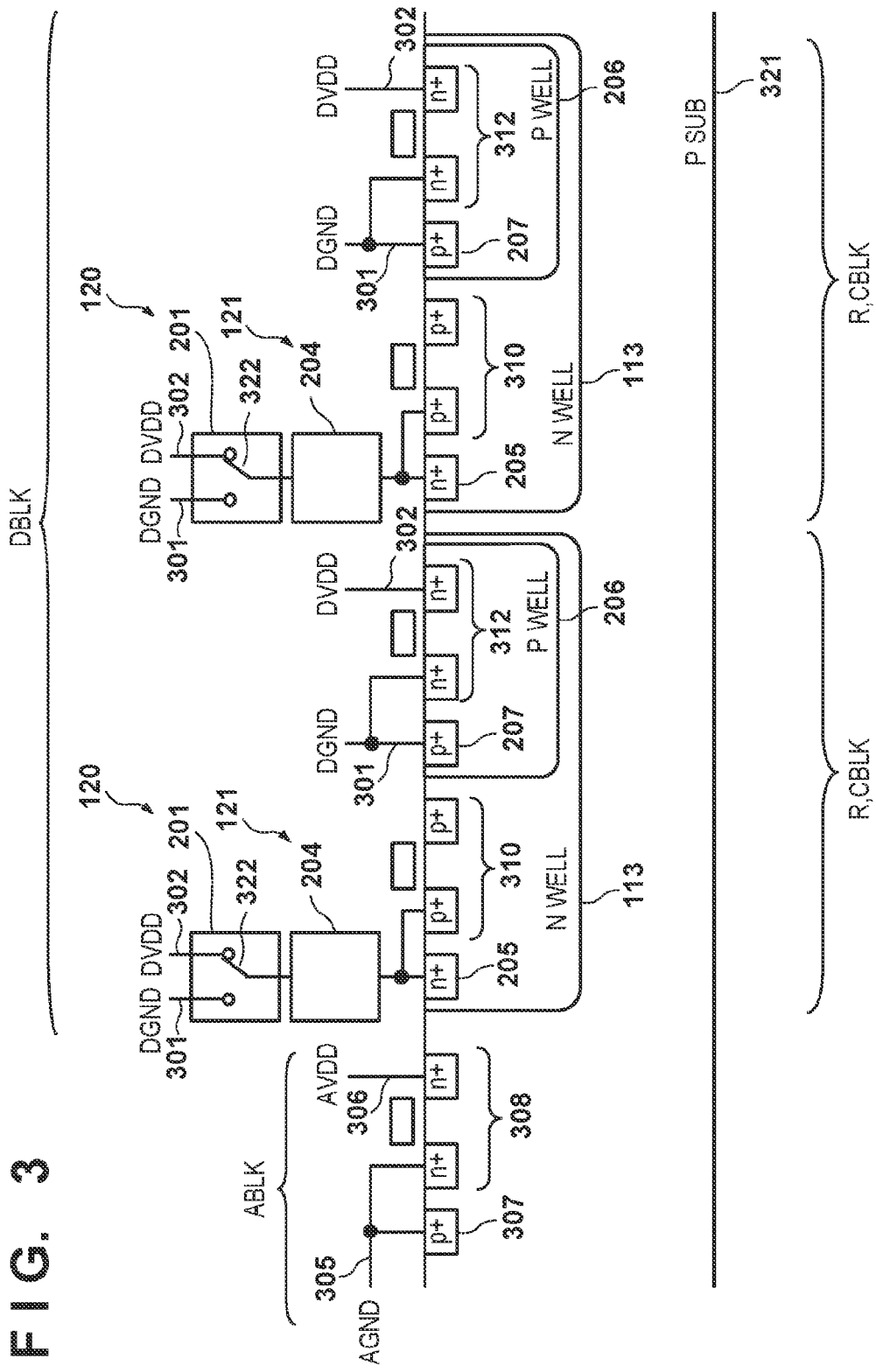
FIG. 3 is a schematic sectional view showing the solid-state image sensor according to the first embodiment of the present invention.

FIG. 3 is a schematic sectional view of the solid-state image sensor 1 according to the first embodiment of the present invention. FIG. 3 partially shows the circuit blocks CBLK (the counters and the memories which constitute the AD converters) on two columns. In this example, the semiconductor substrate 321 is a p-type semiconductor substrate. An NMOS transistor 308 of the analog circuit block ABLK is arranged in the p-type semiconductor substrate as the semiconductor substrate 321. An analog power supply voltage AVDD is supplied to the analog circuit block ABLK via an analog voltage line 306. A ground voltage AGND for an analog circuit is also supplied to the analog circuit block ABLK via a ground line 305 for the analog circuit. Note that the ground voltage AGND is supplied to the p-type semiconductor substrate as the semiconductor substrate 321 via a substrate contact 307.

The respective circuit blocks CBLK (the counters and the memories which constitute the AD converters formed in the regions R) can be arranged in the n-type wells 113. The power supply voltage DVDD for the digital circuit can be supplied to each n-type well 113 via the well contact 205. PMOS transistors 310 can be arranged in the n-type wells 113. The power supply voltage DVDD can be supplied to the source of each PMOS transistor 310. The p-type wells 206 can be arranged in the n-type wells 113. The ground voltage DGND for the digital circuit can be supplied to each p-type well 206 via the well contact 207. NMOS transistors 312 are arranged in the p-type wells 206. The ground voltage DGND is supplied to the source of each NMOS transistor 312.

FIG. 3 only shows the small numbers of representative PMOS transistors and NMOS transistors. In practice, however, the larger numbers of PMOS transistors and NMOS transistors are arranged. In this example, the p-type semiconductor substrate as the semiconductor substrate 321, and the n-type wells 113 and the p-type wells 206 form a triple well structure. The power supply voltage DVDD is supplied to the plurality of n-type wells 113 independently of each other.

Each detector 204 detects occurrence of the latchup in the corresponding n-type well 113 (circuit block CBLK). Unless the corresponding detector 204 detects occurrence of the latchup in the corresponding n-type well 113, the voltage supply circuit 201 supplies the power supply voltage DVDD to the corresponding n-type well 113. On the other hand, when the corresponding detectors 204 detects occurrence of the latchup in the corresponding n-type well 113, the voltage supply circuit 201 temporarily shuts off the supply of the power supply voltage DVDD to the corresponding n-type well 113, and then restarts the supply of the power supply voltage DVDD. The supply of the power supply voltage DVDD may be shut off in a form in which the n-type wells 113 are set in a floating state. It is preferable, however, that the shutoff is performed in a form in which a voltage which stops the latchup, and typically, the ground voltage DGND is supplied to each n-type well 113. According to the latter case, the circuit blocks CBLK can return from the latchup state within a shorter time. Each voltage supply circuit 201 can include a switch 322 for supplying, to the n-type well 113, the power supply voltage DVDD or the ground voltage DGND selectively. The digital power supply voltage DVDD is supplied via each voltage line 302 for the digital circuit. The digital ground voltage DGND is supplied via each ground line 301 for the digital circuit.

The n-type wells 113 electrically isolate the p-type wells 206 from the p-type semiconductor substrate as the semiconductor substrate 321. The latchup stops by shutting off the supply of the power supply voltage DVDD to each n-type well 113, for example, by supplying the voltage (preferably the ground voltage DGND) for stopping the latchup to each n-type well 113.

Figure 4:
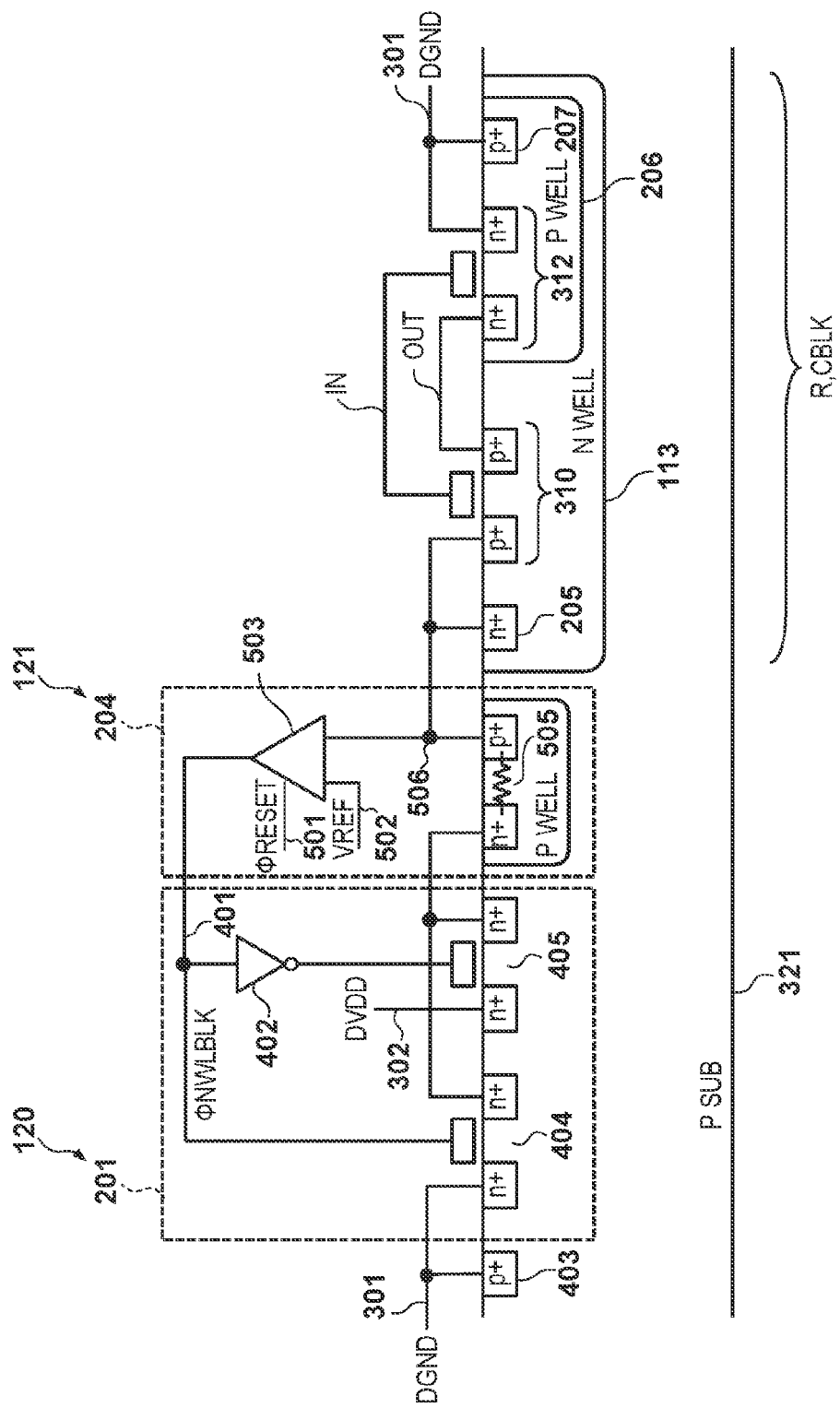
FIG. 4 is a diagram showing an example of the arrangement with a voltage supply circuit and a detector corresponding to one circuit block in the solid-state image sensor according to the first embodiment of the present invention.

FIG. 4 shows an example of the arrangement of the voltage supply circuit 201 and the detector 204 corresponding to one circuit block CBLK in the solid-state image sensor 1 according to the first embodiment of the present invention. The voltage supply circuit 201 and the detector 204 are formed electrically isolated from the n-type well 113 in which the circuit block CBLK is arranged.

The ground voltage DGND is supplied to the p-type semiconductor substrate as the semiconductor substrate 321 via a substrate contact 403. When no latchup has occurred, an output φNWLBLK of the detector 204 is in an inactive state (here, at low level). In this case, an inverter 402 supplies a high-level signal to the gate of an NMOS transistor 405, and then the NMOS transistor 405 is turned on. Consequently, the power supply voltage DVDD is supplied to the detector 204 via the NMOS transistor 405, and is further supplied to the n-type well 113 and the source of the PMOS transistor 310 via a resistive element 505 of the detector 204. Note that the power supply voltage DVDD dropped by the NMOS transistor 405 and the resistive element 505 is supplied to the n-type well 113. Therefore, the power supply voltage DVDD is decided in consideration of that dropped amount.

When the latchup has occurred, an excessive current flows from the voltage line 302 to the ground line 301 via the NMOS transistor 405, the resistive element 505, the n-type well 113, and the p-type well 206. If the voltage of a detection node 506 between the resistive element 505 and the n-type well 113 falls below a reference voltage VREF, the comparator 503 detects this. More specifically, if the voltage of the detection node 506 falls below the reference voltage VREF, the output φNWLBLK of the comparator 503 is activated from low level to high level. That is, each detector 204 detects occurrence of the latchup. Consequently, the output of the inverter 402 is set at low level and the NMOS transistor 405 is turned off. On the other hand, an NMOS transistor 404 is turned on because a high-level signal is supplied to its gate. Consequently, the ground voltage DGND is supplied to the detector 204 via the NMOS transistor 404, and is further supplied to the n-type well 113 and the source of the PMOS transistor 310 via the resistive element 505 of the detector 204. That is, the supply of the power supply voltage DVDD to the n-type well 113 (circuit block CBLK) is temporarily shut off. As described above, in this embodiment, the ground voltage DGND equal to the voltage of the p-type semiconductor substrate as the semiconductor substrate 321 is supplied to the n-type well 113 and the source of the PMOS transistor 310 when the latchup has occurred. This is effective for immediately stopping the operation of a parasitic thyristor causing a latchup. This is also effective for immediately discharging excessive charges outside the circuit. The remaining excessive charges influence a recovery time from the latchup. It is therefore desirable that they are removed as immediately as possible.

The output φNWLBLK of the detector 204 is inactivated by activating a reset signal φRESET supplied to the comparator 503. The reset signal φRESET can be activated by, for example, measuring the lapse of a predetermined time from which the output φNWLBLK of the detector 204 has been activated using a timer. Alternatively, the reset signal φRESET may be activated based on a synchronization signal such as a vertical synchronization signal or a horizontal synchronization signal. The vertical synchronization signal is a synchronization signal which sets a time period in which the row selection unit 107 selects all the rows to one period. The horizontal synchronization signal is a synchronization signal which sets a time period in which the column selection unit 106 selects all the columns in one row to one period.

The arrangement of the detector 204 is not limited to the above-described example. The detector 204 may have any arrangement capable of detecting occurrence of the latchup. An amplification circuit may be arranged between the detection node 506 and the comparator 503 in order to detect occurrence of the latchup at high sensitivity.

Figure 5:
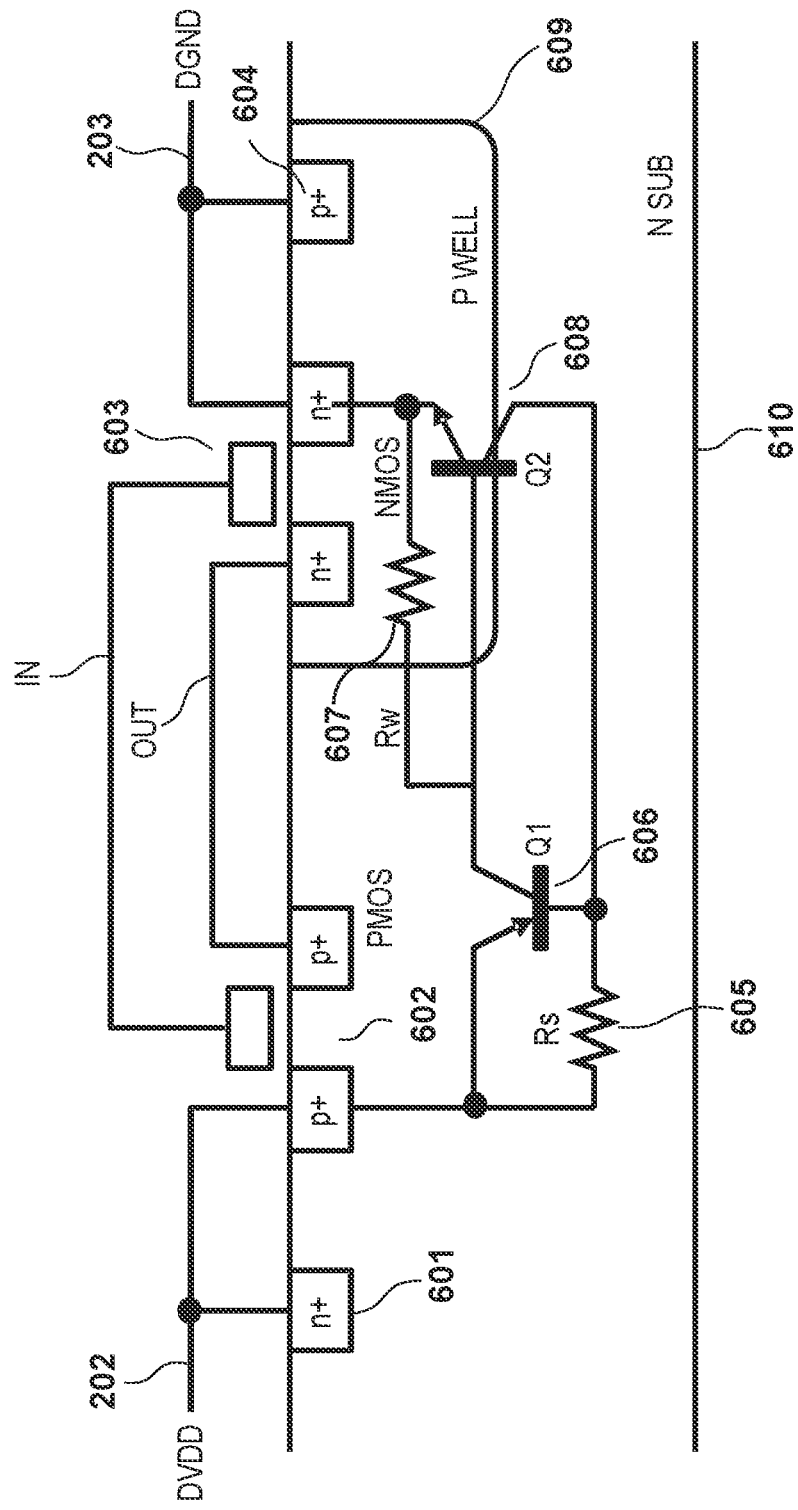
FIG. 5 is a diagram for explaining a latchup in a general well structure.

FIG. 5 is a diagram for explaining a latchup in a general well structure. A PMOS transistor 602 is arranged in an n-type substrate 610. A p-type well 609 is arranged in the n-type substrate 610. An NMOS transistor 603 is arranged in the p-type well 609. Note that the PMOS transistor 602 and the NMOS transistor 603 constitute an inverter. The power supply voltage DVDD is supplied to a substrate contact 601 and the source of the PMOS transistor 602 via the voltage line 202. The ground voltage DGND is supplied to a well contact 604 and the source of the NMOS transistor 603 via the ground line 203.

A pnp parasitic bipolar transistor (Q1) 606, an npn parasitic bipolar transistor (Q2) 608, a parasitic resistance (Rs) 605, and a parasitic resistance (Rw) 607 exist in this structure. A latchup is a phenomenon in which the excessive current suddenly flows from the voltage line to the ground line when the circuit is in operation and the circuit does not operate normally. Such a current flows continuously unless the supply of the power supply voltage is shut off and can return to an original state once the supply of the power supply voltage is shut off.

The pnp and npn parasitic bipolar transistors formed between the n-type substrate 610 and the p-type well 609 constitute a parasitic thyristor. The latchup occurs by forming a positive-feedback circuit to which both the pnp and npn parasitic bipolar transistors flow with current when a base-emitter voltage exceeds a voltage causing flow of forward current of a diode by a trigger current.

A Single Event Latchup (SEL) occurs by generating a large amount of ionization charges when a proton beam or a heavy particle passes through a semiconductor, and activating the above-described parasitic thyristor by setting this as the trigger current. Therefore, the SEL has the characteristic of locally occurring near a point through which radiation has passed.

The characteristic such as the amplification ratio of the pnp parasitic transistor having a pnp structure is generally determined by the concentration of a diffusion layer in each process. On the other hand, the characteristic of a pnp parasitic transistor having an npn structure depends on a layout. In order to prevent the latchup, it is effective that a $p^{++}$-type guard ring and an $n^{++}$-type guard ring are formed on a substrate surface as well as increasing a well concentration, and decreasing the resistance values Rs and Rw and a current amplification ratio hFE of each parasitic bipolar transistor. A method of reducing the parasitic resistance by providing as many well contacts as possible is also effective. Such latchup measures can also be taken as much as possible even in the first embodiment.

However, the method of forming the $p^{++}$-type guard ring and $n^{++}$-type guard ring on the substrate surface, and a method of providing as many of the the well contacts as possible result in increasing a layout area. It is therefore very difficult to apply those methods to a column AD converter of a digital output CMOS image sensor with advanced reduction of a pixel pitch and a chip size. The column AD converter has the strictest layout constraint in a digital circuit of the digital output CMOS image sensor. As a result, a circuit having the weakest latchup tolerance becomes the column AD converter. That is, the SEL is likely to occur in the column AD converter. As a result, in many cases, no image can be obtained at all even if other parts are in operation.

Figure 6:
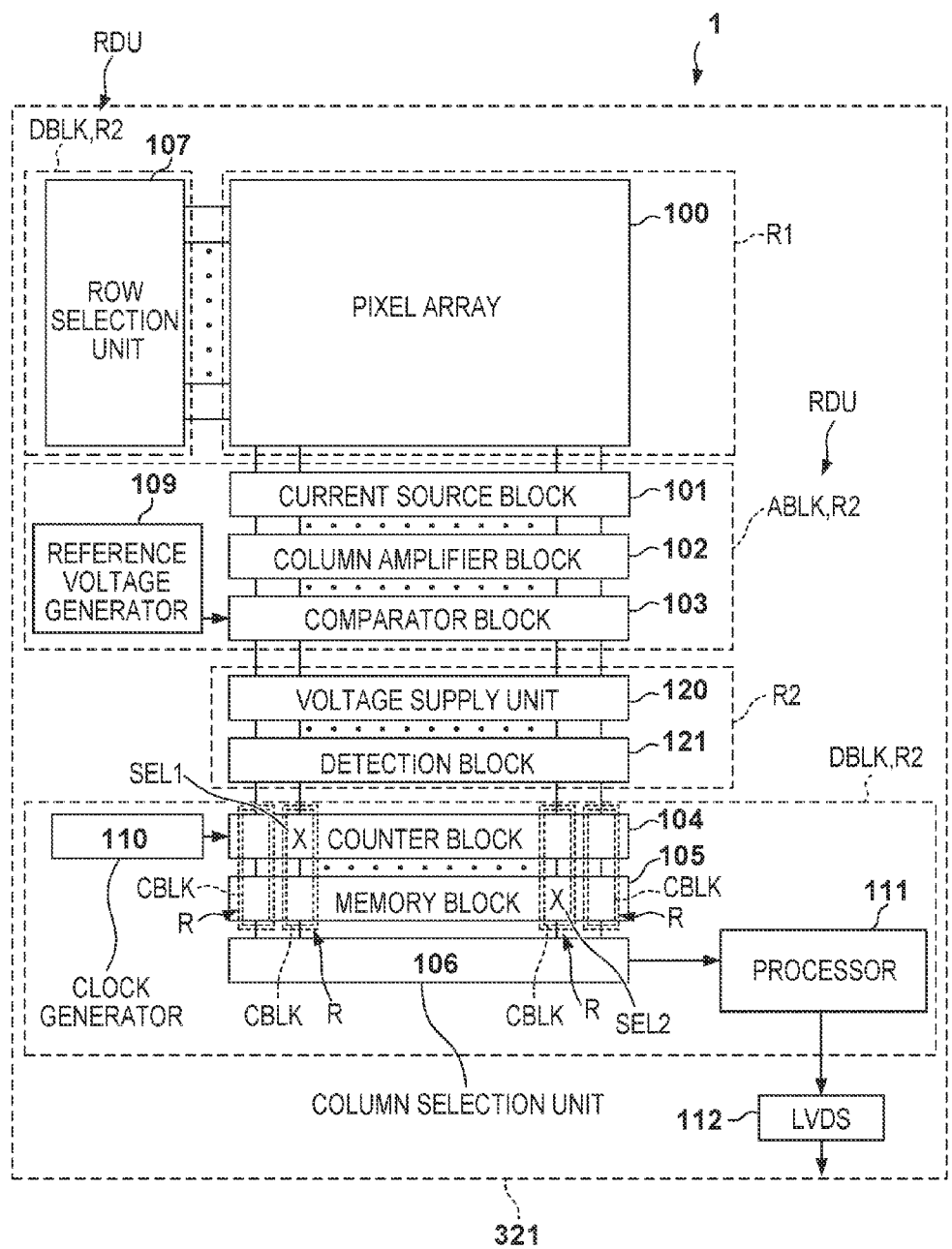
FIG. 6 is a block diagram schematically showing a characteristic phenomenon when a SEL occurs in a circuit block which constitutes a column AD converter.
Figure 7:
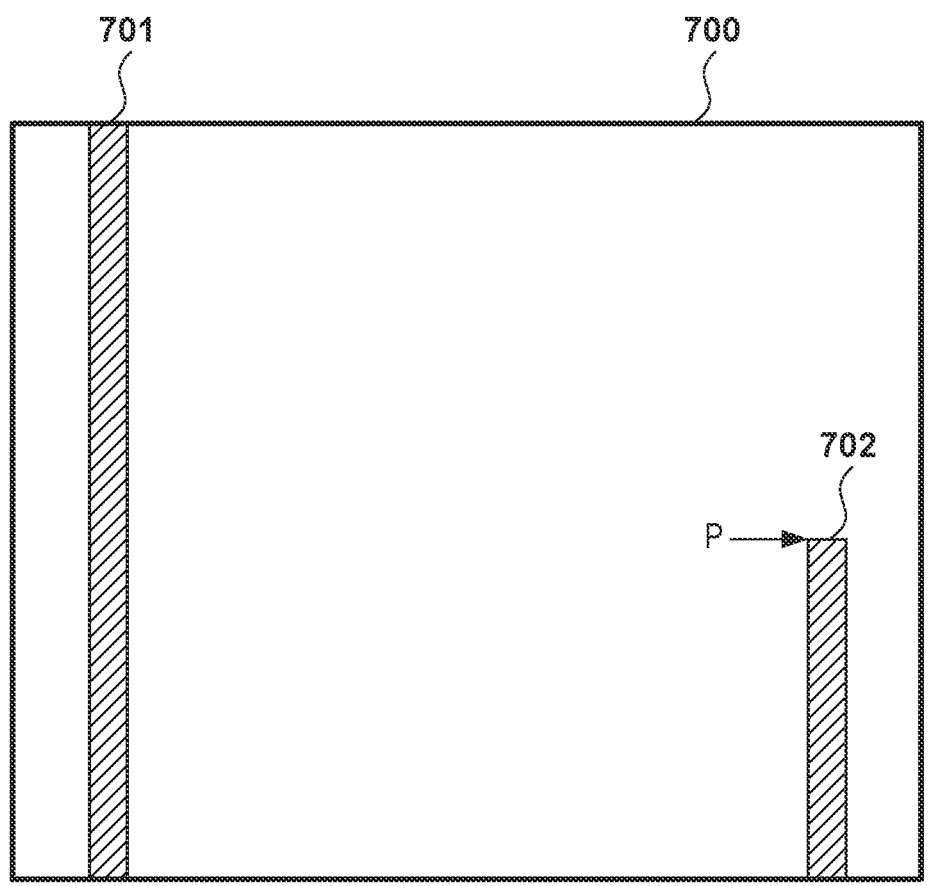
FIG. 7 is a view schematically showing the characteristic phenomenon when the SEL occurs in the circuit block which constitutes the column AD converter.

Each of FIGS. 6 and 7 schematically shows a characteristic phenomenon in which the SEL occurs in the circuit blocks CBLK which constitute the column AD converters. SEL1 indicates a SEL occurring in a certain circuit block CBLK in a preceding frame. The column AD converter loses its function and cannot output a signal of the pixel on the column corresponding to the circuit block CBLK where SEL1 has occurred. Therefore, as schematically shown in FIG. 7, the signal on the column corresponding to the circuit block CBLK where SEL1 has occurred becomes an abnormal signal, causing a vertical line defect 701 in an image 700 output from the solid-state image sensor 1.

SEL2 indicates a SEL occurring in another circuit block CBLK in a current frame. A situation will be described in which the SEL occurs in the middle of the current frame. After the occurrence of SEL2, a signal on the column corresponding to the circuit block CBLK where SEL2 has occurred becomes an abnormal signal, causing a vertical line defect 702 from a point P. If this is left as it is, it is turned into a complete vertical line defect like the vertical line defect 701 from the next frame and it becomes impossible to output an image signal in the subsequent frame. The SEL occurs continuously at a certain probability. Therefore, not only the vertical line defects 701 and 702 but also a new vertical line defect is generated. At this time, the parasitic thyristor newly operates each time the SEL occurs, increasing an abnormal current. The solid-state image sensor 1 may be damaged unless the latchup measures are taken.

The SEL occurs in a very limited region. It is therefore possible to perform control in a minute current state by isolating the wells in which the circuit blocks CBLK are arranged from each other and processing the SEL in a local area. A temperature rise caused by an increase in the current results in increasing the occurrence probability of another SEL or the like and easily causing a problem such as a considerable time for recovery. However, they can also be prevented by isolating the wells in which the circuit blocks CBLK are arranged from each other.

In the first embodiment, even if the SELs have occurred in some circuit blocks of the plurality of circuit blocks CBLK, it is possible to cancel the latchups immediately and recover the some circuit blocks CBLK to a normal operation by stopping the supply of the power supply voltage to them.

In general, a time equal to or larger than the ms order is needed physically to recover from a latchup. According to the first embodiment, however, recovery can be achieved, in the shortest period of time, in the frame next to the frame where the latchup has occurred. That is, processing can be conducted with a speed at which a user observing an image does not notice occurrence of the latchup.

Ideally, the unit of one circuit block CBLK is set to one column. However, the number of wells electrically isolated from each other may be decreased by setting the unit of one circuit block CBLK to the plurality of columns.

In the triple well structure as in the first embodiment, the concentrations of the respective wells can be set independently. This is advantageous in increasing the latchup tolerance. In the first embodiment, the n-type wells are electrically isolated from each other in the triple well structure. In the triple well structure, however, the p-type wells are electrically isolated from each other with respect to the p-type semiconductor substrate. Therefore, the plurality of p-type wells may be isolated from each other and the supply of the power supply voltage to them may be controlled individually. More specifically, it is possible to isolate the plurality of p-type wells from each other, supply the ground voltage DGND to the p-type wells where no latchup has occurred, and supply the power supply voltage DVDD to the p-type wells where the latchup has occurred.

In general, in a CMOS image sensor, the p-type well and the p-type well for an analog circuit of a pixel are formed on an n-type substrate or an n-type epitaxial layer, and they are set to common analog GND. Each digital circuit of the AD converter (column AD converter) is preferably configured to divide the p-type wells serving as common digital GND into a plurality of blocks and control a power supply voltage supplied to them. In order to converge the latchup immediately, it is preferable that the n-type wells (or the p-type wells) and the p-type wells (or the n-type wells) electrically isolated from each other are set at the same potential. Whether wells to be isolated are the p-type wells or the n-type wells can be selected in accordance with the circuit arrangement of the solid-state image sensor.

In this embodiment, an arrangement of controlling the supply of the power supply to the n-type wells electrically isolated from each other has been described. As a modification, the p-type wells may electrically be isolated from each other and the supply of the power supply may be controlled individually. In the case of the p-type wells, for example, the ground voltage DGND is supplied as the power supply voltage. To the p-type wells where the latchup occurs has occurred, the supply of the ground voltage DGND can be shut off and the power supply voltage DVDD can be supplied at that time.

Figure 8:
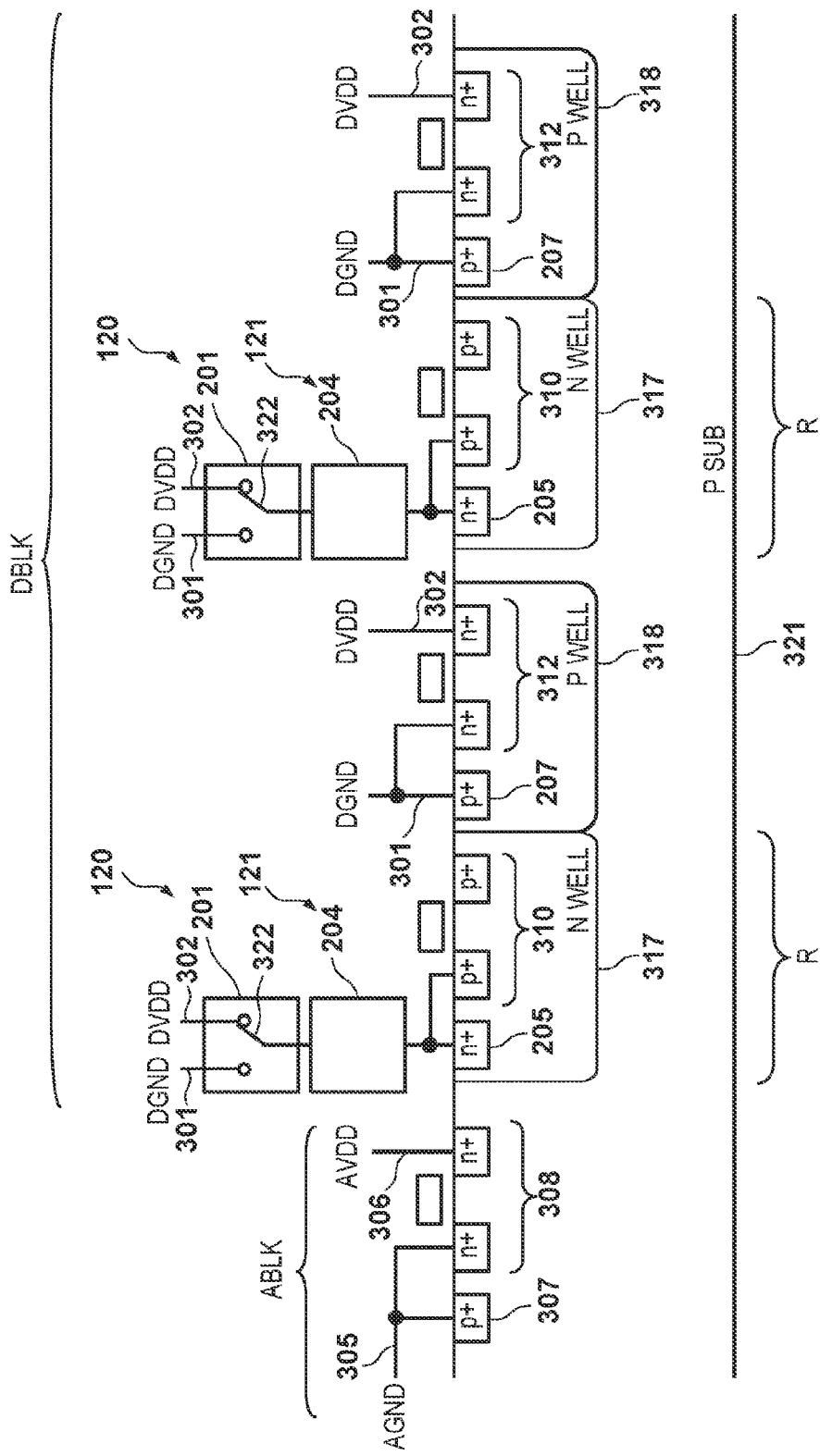
FIG. 8 is a schematic sectional view showing a solid-state image sensor according to the second embodiment of the present invention.

FIG. 8 is a schematic sectional view showing a solid-state image sensor 1 according to the second embodiment of the present invention. FIG. 8 partially shows circuit blocks CBLK (counters and memories which constitute AD converters) on two columns. Matters that are not mentioned in the second embodiment can comply with the first embodiment. In the solid-state image sensor 1 of the second embodiment, a p-type semiconductor substrate as a semiconductor substrate 321 has a twin well structure. The solid-state image sensor 1 of the second embodiment is simpler than the solid-state image sensor 1 of the first embodiment in the structure of the semiconductor substrate 321 and hence a manufacturing step.

The semiconductor substrate 321 includes n-type wells 317 which constitute regions R electrically isolated from each other and p-type wells 318 electrically conducted to the p-type semiconductor substrate as the semiconductor substrate 321. Parts of the respective circuit blocks CBLK are arranged in the n-type wells 317 which constitute the regions R electrically isolated from each other. Therefore, the part arranged in the n-type well 317 out of the circuit block CBLK and the part arranged in the other n-type well 317 out of the other circuit block CBLK are electrically isolated from each other.

When latchups have occurred in some circuit blocks CBLK out of the plurality of circuit blocks CBLK, voltage supply unit 120 temporarily shuts off the supply of a power supply voltage to the regions R (n-type wells 317) in which the parts of the some circuit blocks CBLK are arranged. Then, the voltage supply unit 120 restarts the supply of the power supply voltage to the regions R where the supply of the power supply voltage has been shut off. The voltage supply unit 120 continues to supply the power supply voltage to the region R (n-type well 317) in which the part of the circuit block CBLK, out of the plurality of circuit blocks CBLK, where no latchup has occurred.

Figure 9:
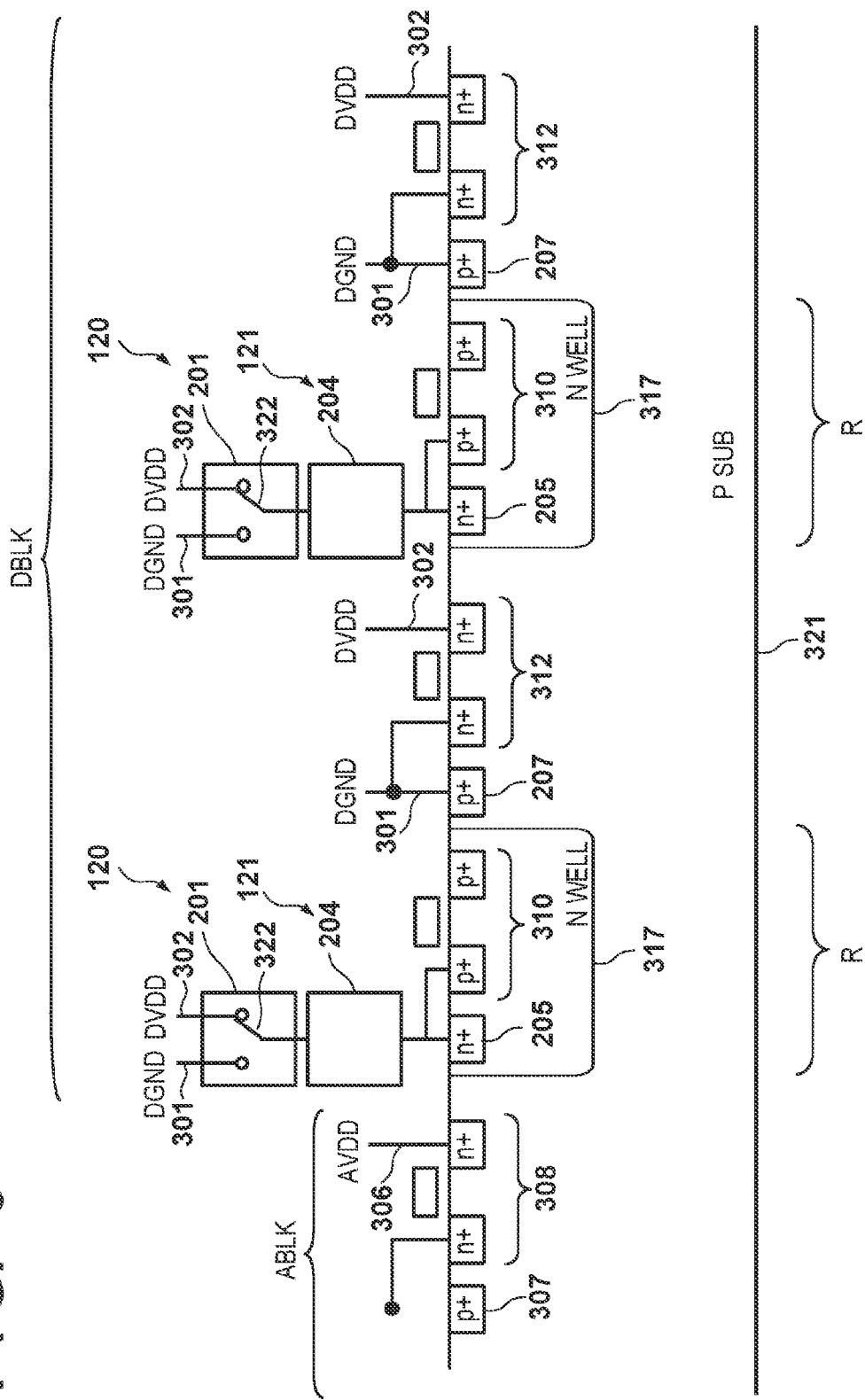
FIG. 9 is a schematic sectional view showing a modification of the solid-state image sensor according to the second embodiment of the present invention.

FIG. 9 is a schematic sectional view showing a modification of the solid-state image sensor 1 according to the second embodiment of the present invention. FIG. 9 partially shows the circuit blocks CBLK (the counters and the memories which constitute the AD converters) on two columns. Matters that are not mentioned in this modification can comply with the second embodiment that has been described with reference to FIG. 8. This modification has a structure in which the p-type wells 318 are removed from the solid-state image sensor 1 of the second embodiment that has been described with reference to FIG. 8.

Figure 10:
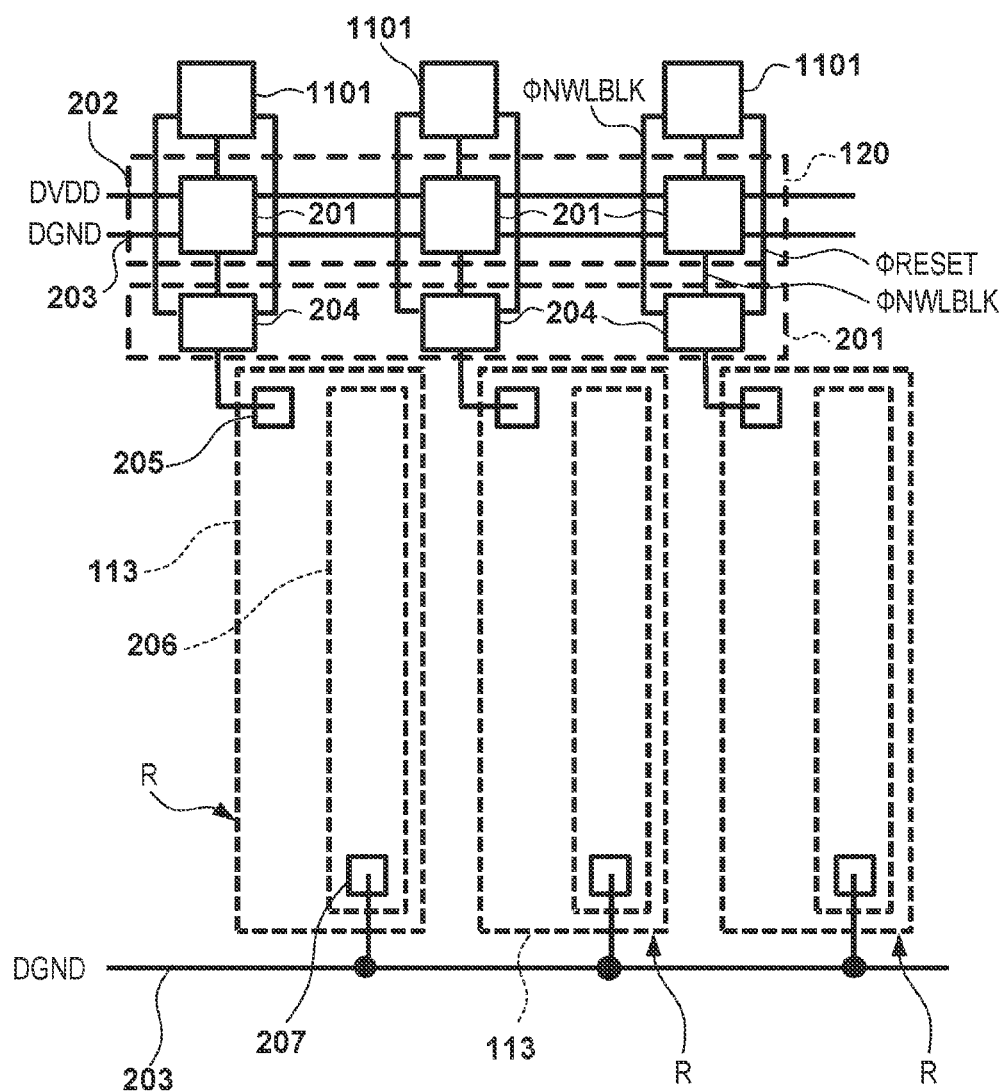
FIG. 10 is a schematic plan view showing a solid-state image sensor according to the third embodiment of the present invention.

FIG. 10 is a schematic plan view showing a solid-state image sensor 1 according to the third embodiment of the present invention. FIG. 10 shows circuit blocks CBLK (counters and memories which constitute AD converters) on three columns together with a voltage supply unit 120, a detection block 121, a decoder/encoder 1106, and timers 1001. Matters that are not mentioned in the third embodiment can comply with the first or second embodiment. The solid-state image sensor 1 of the third embodiment includes a timer unit. The timer unit includes, for each region R, the timer 1001 which provides a timing to restart the supply of a power supply voltage to the region R where the supply of the power supply voltage has been shut off. That is, the timers 1001 and the circuit blocks CBLK are equal in number. Each timer 1001 can be made of, for example, a digital counter.

SELs occur randomly. In an environment in which the SELs occur at a high frequency, the SELs may occur successively in the plurality of regions R in one frame. The timing to restart the supply of the power supply voltage to the region R where the SEL has occurred after shutting off the supply of the power supply voltage to the region R in response to detection of occurrence of the SEL is preferably determined in response to the timing of occurrence of the SEL. For this reason, in the third embodiment, the timers are provided for the respective regions R electrically isolated from each other and used as a unit of controlling the supply of the power supply voltage. Each timer 1001 starts time measurement (counting) in response to activation of an output ϕNWLBLK of a detector 204 and activates a reset signal ϕRESET when a set time has elapsed. In one example, each detector 204 includes a comparator 503 and inactivates the output ϕNWLBLK by activating the reset signal ϕRESET supplied to the comparator 503, as described above. Consequently, each voltage supply circuit 201 restarts the supply of the power supply voltage to the corresponding region R.

Figure 11:
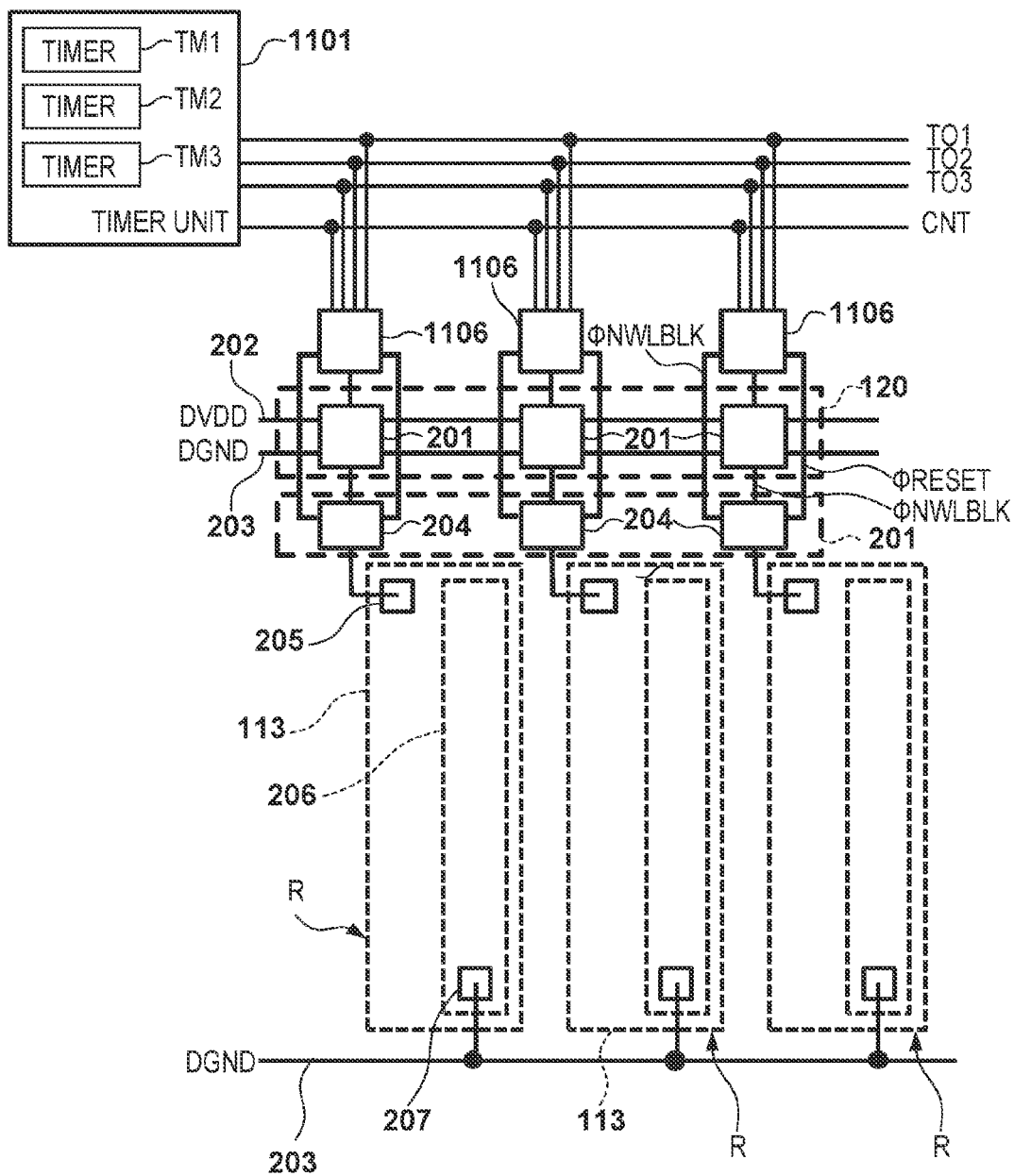
FIG. 11 is a schematic plan view showing a solid-state image sensor according to the fourth embodiment of the present invention.

FIG. 11 is a schematic plan view showing a solid-state image sensor 1 according to the fourth embodiment of the present invention. FIG. 11 shows circuit blocks CBLK (counters and memories which constitute AD converters) on three columns together with a voltage supply unit 120, a detection block 121, and a timer unit 1101. The timer unit 1101 includes timers TM1, TM2, and TM3 smaller in number than a plurality of regions R electrically isolated from each other. In an example shown in FIG. 11, the timer unit 1101 includes three times TM1, TM2, and TM3. The timers TM1, TM2, and TM3 output count values to timer output lines TO1, TO2, and TO3, respectively. A decoder/encoder 1106 is provided for each of the plurality of regions R electrically isolated from each other. A control line group CNT is a signal line group for exchanging information between the timer unit 1101 and the decoders/encoders 1106.

Even if SELs occur at a high frequency, it is considered that the SELs hardly occur almost simultaneously in all the regions R. The timers never operate unless the SEL occurs. It is therefore not always necessary to provide the timers for all the regions R. Hence, the timers are smaller in number than the plurality of regions R in the fourth embodiment.

The occurrence frequency of the SELs changes depending on a usage environment. In a conceivable usage environment, if it is expected that the maximum number of SELs occurring in a time required to recover from the SEL is N in consideration of safety, N timers are enough in number. The number of timers TM1, TM2, and TM3 can be determined in accordance with such a guideline.

Each detector 204 activates an output ϕNWLBLK when detecting occurrence of the SEL in the corresponding region R. Each voltage supply circuit 201 shuts off the supply of the power supply voltage to the corresponding region R in response to activation of the output ϕNWLBLK. The output ϕNWLBLK of each detector 204 is also transmitted to the timer unit 1101 via a control signal group CNT. At this time, identification information which specifies the region R where the SEL has occurred is also transmitted from each detector 204 to the timer unit 1101. Consequently, the timer unit 1101 grasps the time when the SEL has occurred and the corresponding region R, and starts a count operation by using this as a trigger. A case is assumed here in which the number of timers TM1, TM2, and TM3 is enough for the occurrence frequency of the SELs. Thus, at least one timer is always available. Assuming that this available timer is the timer TM1, the timer TM1 is caused to perform the count operation (time measurement operation). The timer TM1 activates the timer output TM1 after the lapse of a predetermined time required to recover from occurrence of the SEL (the shutoff of the supply of the power supply voltage to the regions R performed in response to this). Further, the timer unit 1101 activates the timer output TM1 and outputs, to the control signal line group CNT, identification information which identifies the detector 204 that has given the trigger for causing the timer TM1 to perform the count operation.

Each decoder/encoder 1106 corresponding to the region R where the SEL has occurred and the supply of the power supply voltage has been shut off can recognize, in response to activation of the timer output TM1 and the output of identification information, that the timer output TM1 has been provided for itself. Each decoder/encoder 1106 activates a reset signal ϕRESET in response to this.

When it is assumed that a plurality of SELs hardly occur simultaneously, the number of timer output lines may be decreased by using them time-divisionally. The fourth embodiment is effective when an area occupied by each decoder/encoder can be smaller than that by each timer.

The fifth embodiment of the present invention will be described below. Matters that are not mentioned in the fifth embodiment can comply with the first or second embodiment. When a time required to recover from a SEL is sufficiently shorter than one frame time, a vertical synchronization signal can be used as a reset signal ϕRESET. The vertical synchronization signal is a synchronization signal which sets a time period in which a row selection unit 107 selects all rows to one period. In this case, a frame period becomes the maximum recovery time. When the SELs have occurred randomly in three portions in one frame, timings at which the supply of a power supply voltage is shut off in accordance with occurrence of the SELs are different from each other, while timings at which the supply of the power supply is restarted become equal to each other. In the fifth embodiment, a specific timer is not needed. It is therefore possible to simplify the circuit arrangement of a solid-state image sensor 1.

Furthermore, instead of using a vertical synchronization signal for one frame, a vertical synchronization signal for n frames (n is a natural number equal to or larger than two) may be used. For example, if the vertical synchronization signal for two frames is used, it is possible to guarantee a time for one frame as the minimum recovery time with respect to any occurrence of the SEL. For example, when capturing a moving image at 30 fps, 33 ms is guaranteed as the minimum recovery time. In a high-speed moving image of 60 fps, 17 ms is guaranteed as the minimum recovery time. In general, a time about the ms order is needed physically to recover from a latchup. However, the recovery time of 17 ms in the high-speed moving image of 60 fps is sufficient for almost all occurrence of the SELs. Even if recovery cannot be achieved in this time and the supply of the power supply voltage is shut off again, the supply of the power supply voltage can be restarted in response to the vertical synchronization signal after two frames.

As described above, it is possible, by using the vertical synchronization signal as the reset signal ϕRESET, to recover from the SEL in a subsequent recovery operation even if it is impossible to recover from the SEL in one recovery operation. In the above-described operation, for example, vertical line defects may be generated throughout several frames. However, a user watching a moving image hardly recognizes them.

Figure 12:
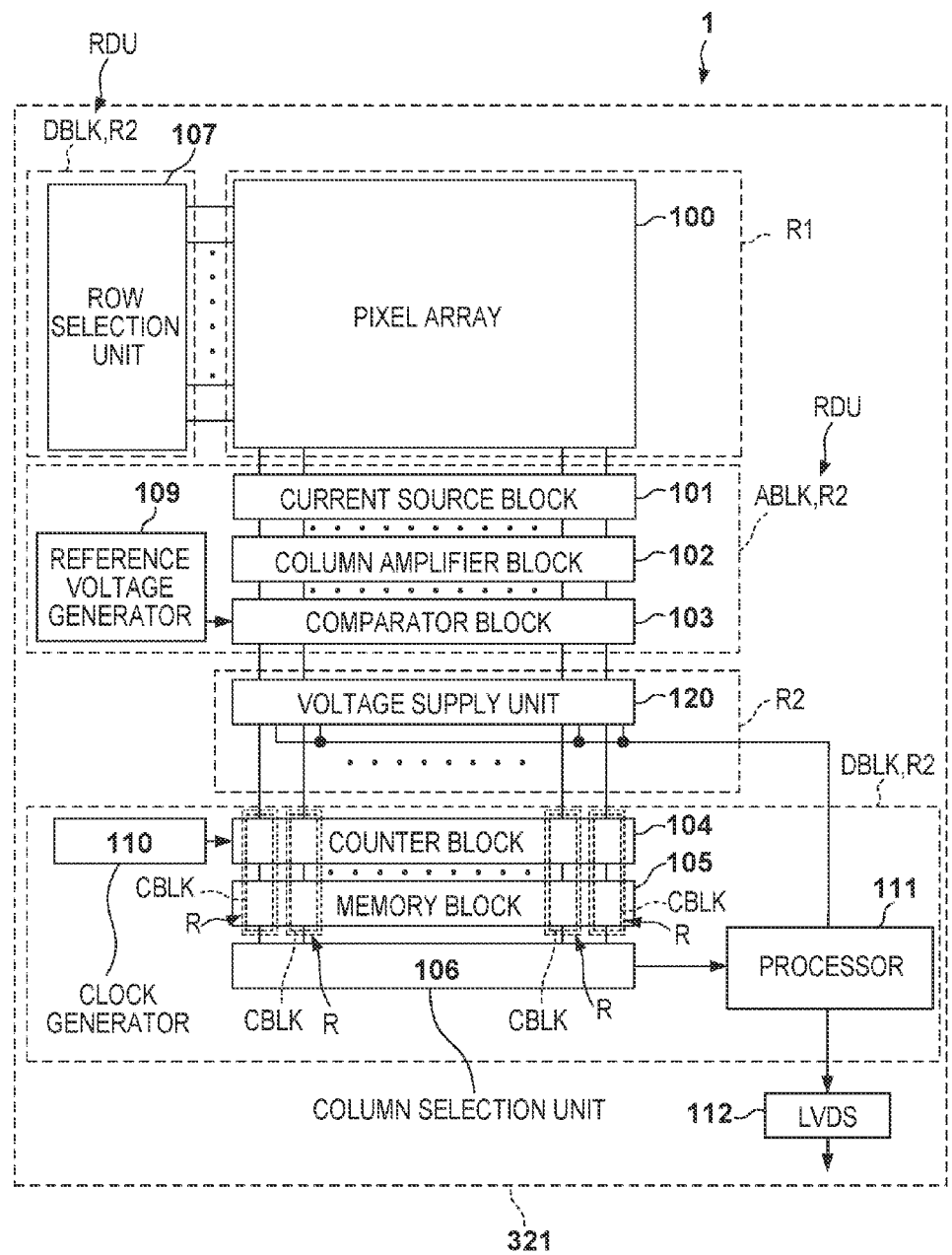
FIG. 12 is a block diagram showing the arrangement of a solid-state image sensor according to the sixth embodiment of the present invention.

FIG. 12 shows the arrangement of a solid-state image sensor 1 according to the sixth embodiment of the present invention. In the sixth embodiment, occurrence of a latchup is detected by signal processing. It is expected in the sixth embodiment that the consumption of a power supply voltage is lower and a detection response to occurrence of the latchup is faster than in a method of detecting the latchup by using a resistive element.

In FIG. 7, a position P provides information indicating a timing at which the latchup has occurred. If a column AD converter loses its function due to occurrence of the latchup, for example, an offset value can be output. This offset value is apparently different from a normal value. A signal on a column to which P belongs is a vertical line defect 702. In the sixth embodiment, a processor 111 functions as a detector. The processor 111 specifies an occurrence timing and an occurrence area (circuit block CBLK (region R)) of the latchup by monitoring a signal supplied from a column selection unit 106. Upon detecting occurrence of the latchup, the processor 111 activates an output ϕNWLBLK to each voltage supply circuit 201 of a voltage supply unit 120 corresponding to the region R where the latchup has occurred. Occurrence of the latchup can be detected by comparing, for example, a signal of a pixel to be determined with a signal of its surrounding pixel (for example, a signal having the same color as the pixel to be determined). It is possible to further increase a detection accuracy by performing this comparison throughout a plurality of rows and determining the presence/absence of occurrence of the latchup based on that result. The output ϕNWLBLK can be inactivated in accordance with, for example, an elapsed time from activation of the output ϕNWLBLK or a vertical synchronization signal.

A processor outside of the solid-state image sensor 1 may detect occurrence of the latchup and that result may be provided to the solid-state image sensor 1.

As an application of the solid-state image sensor according to the above-described embodiments, a camera in which the solid-state image sensor is assembled will exemplarily be described below. The concept of the camera includes not only an apparatus mainly aiming at shooting but also an apparatus (for example, a personal computer or a portable terminal) accessorily having a shooting function. The camera includes the solid-state image sensor according to the present invention exemplified as the above-described embodiments, and a processor which processes a signal output from the solid-state image sensor. The processor can include, for example, an A/D converter and a processor which processes digital data output from the A/D converter.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-069807, filed Mar. 30, 2015, which is hereby incorporated by reference herein in its entirety.

What is claimed is:

1. A solid-state image sensor comprising:
a pixel array including a plurality of pixels;
a readout unit configured to read out a signal from the pixel array; and
a voltage supply unit,
wherein the pixel array, the readout unit, and the voltage supply unit are arranged in a semiconductor substrate,
the readout unit includes a plurality of circuit blocks and the plurality of circuit blocks are respectively arranged in a plurality of regions electrically isolated from each other in the semiconductor substrate, at least a part of each of the plurality of circuit blocks being arranged in a corresponding one of the plurality of regions,
when latchup has occurred in at least one circuit block out of the plurality of circuit blocks, the voltage supply unit shuts off supply of a power supply voltage to the region, out of the plurality of regions, in which at least the part of the at least one circuit block is arranged, and thereafter performs the supply of the power supply voltage to the region in which at least the part of the at least one circuit block is arranged, and
the voltage supply unit supplies the power supply voltage to the region, out of the plurality of regions, in which at least the part of the circuit block where no latchup has occurred is arranged, while shutting off the supply of the power supply voltage to the region in which at least the part of the at least one circuit block is arranged.

2. The sensor according to claim 1, wherein the semiconductor substrate includes a first region and a second region different from the first region, the pixel array is arranged in the first region, and the readout unit is arranged in the second region.

3. The sensor according to claim 1, further comprising a plurality of detectors arranged in the semiconductor substrate and configured to detect occurrence of the latchup in the plurality of regions.

4. The sensor according to claim 3, wherein each of the plurality of detectors detects occurrence of the latchup based on a current flowing from a voltage line to which the power supply voltage is supplied to the corresponding region out of the plurality of regions.

5. The sensor according to claim 4, wherein each of the plurality of detectors includes a resistive element and detects occurrence of the latchup by detecting a drop in a voltage across the resistive element.

6. The sensor according to claim 1, wherein the voltage supply unit supplies a ground voltage to a voltage line of the circuit block, out of the plurality of circuit blocks, where the latchup has occurred.

7. The sensor according to claim 1, wherein the plurality of regions respectively include wells electrically isolated from each other.

8. The sensor according to claim 7, wherein the wells are of an n type,
the supply of the power supply voltage to the region in which at least the part of the at least one circuit block where the latchup has occurred is arranged is shut off by supplying a ground voltage to the respective well, and
a voltage higher than the ground voltage is supplied, as the power supply voltage, to the respective well.

9. The sensor according to claim 7, wherein the wells are of a p type,
a ground voltage is supplied, as the power supply voltage, to the wells, and
the supply of the power supply voltage to the region in which at least the part of the at least one circuit block where the latchup has occurred is arranged is shut off by supplying a voltage higher than the ground voltage to the respective well.

10. The sensor according to claim 5, wherein the plurality of regions respectively include wells electrically isolated from each other.

11. The sensor according to claim 1, wherein each of the plurality of regions includes an n-type well and a p-type well is arranged in the n-type well, and
the voltage supply unit supplies the power supply voltage to a source of a PMOS transistor formed in the n-type well of the region and the n-type well of the region in which the circuit block, out of the plurality of circuit blocks, where no latchup has occurred is arranged, and supplies a voltage for stopping the latchup to the source of the PMOS transistor formed in the n-type well of the region and the n-type well of the region in which the circuit block, out of the plurality of circuit blocks, where the latchup has occurred is arranged.

12. The sensor according to claim 11, wherein the voltage for stopping the latchup is a voltage supplied to the p-type well of each of the plurality of regions.

13. The sensor according to claim 11, wherein the voltage for stopping the latchup is a ground voltage.

14. The sensor according to claim 1, wherein the voltage supply unit is arranged in a region different from the plurality of regions in which the plurality of circuit blocks are arranged.

15. The sensor according to claim 1, wherein the voltage supply unit includes a timer unit, and the voltage supply unit temporarily shuts off the supply of the power supply voltage to the region in which at least the part of the at least one circuit block where the latchup has occurred is arranged, and then restarts the supply of the power supply voltage based on an output from the timer unit.

16. The sensor according to claim 15, wherein the timer unit includes timers equal in number to the plurality of circuit blocks.

17. The sensor according to claim 15, wherein the timer unit includes timers smaller in number than the plurality of circuit blocks, and
the voltage supply unit assigns the timers to the circuit block where the latchup has occurred and, based on each output from the assigned timers, restarts the supply of the power supply voltage to the region in which at least the part of the at least one circuit block where the latchup has occurred is arranged.

18. The sensor according to claim 10, wherein the voltage supply unit includes a timer unit, and the voltage supply unit temporarily shuts off the supply of the power supply voltage to the region in which at least the part of the at least one circuit block where the latchup has occurred is arranged, and then restarts the supply of the power supply voltage based on an output from the timer unit.

19. The sensor according to claim 1, wherein each of the plurality of circuit blocks includes an AD converter.

20. A solid-state image sensor comprising:
a pixel array including a plurality of pixels;
a readout unit configured to read out a signal from the pixel array; and
a voltage supply unit,
wherein the pixel array, the readout unit, and the voltage supply unit are arranged in a semiconductor substrate,
the readout unit includes a plurality of circuit blocks arranged separately in a plurality of regions electrically isolated from each other in the semiconductor substrate,
when latchup has occurred in at least one circuit block out of the plurality of circuit blocks, the voltage supply unit shuts off supply of a power supply voltage to the region, out of the plurality of regions, in which the at least one circuit block is arranged, and then performs the supply of the power supply voltage to the region in which the at least one circuit block is arranged, and
the voltage supply unit supplies the power supply voltage to the region, out of the plurality of regions, in which the circuit block where no latchup has occurred is arranged, while shutting off the supply of the power supply voltage to the region in which the at least one circuit block is arranged.

21. A camera comprising:
a solid-state image sensor; and
a processor configured to process a signal output from the solid-state image sensor,
wherein the solid-state image sensor comprises:
a pixel array including a plurality of pixels;
a readout unit configured to read out a signal from the pixel array; and
a voltage supply unit,
wherein the pixel array, the readout unit, and the voltage supply unit are arranged in a semiconductor substrate,
the readout unit includes a plurality of circuit blocks and the plurality of circuit blocks respectively arranged in a plurality of regions electrically isolated from each other in the semiconductor substrate, at least a part of each of the plurality of circuit blocks being arranged in a corresponding one of the plurality of regions,
when latchup has occurred in at least one circuit block out of the plurality of circuit blocks, the voltage supply unit shuts off supply of a power supply voltage to the region, out of the plurality of regions, in which at least the part of the at least one circuit block is arranged, and thereafter performs the supply of the power supply voltage to the region in which at least the part of the at least one circuit block is arranged, and
the voltage supply unit supplies the power supply voltage to the region, out of the plurality of regions, in which at least the part of the circuit block where no latchup is being occurred is arranged, while shutting off the supply of the power supply voltage to the region in which at least the part of the at least one circuit block is arranged.

22. A camera comprising:
a solid-state image sensor; and
a processor configured to process a signal output from the solid-state image sensor,
wherein the solid-state image sensor comprises:
a pixel array including a plurality of pixels;
a readout unit configured to read out a signal from the pixel array; and
a voltage supply unit,
wherein the pixel array, the readout unit, and the voltage supply unit are arranged in a semiconductor substrate,
the readout unit includes a plurality of circuit blocks arranged separately in a plurality of regions electrically isolated from each other in the semiconductor substrate,
when latchup has occurred in at least one circuit block out of the plurality of circuit blocks, the voltage supply unit shuts off supply of a power supply voltage to the region, out of the plurality of regions, in which the at least one circuit block is arranged, and then performs the supply of the power supply voltage to the region in which the at least one circuit block is arranged, and
the voltage supply unit supplies the power supply voltage to the region, out of the plurality of regions, in which the circuit block where no latchup has occurred is arranged, while shutting off the supply of the power supply voltage to the region in which the at least one circuit block is arranged.

* * * * *